(12) United States Patent
Sawada

(10) Patent No.: US 11,181,543 B2
(45) Date of Patent: Nov. 23, 2021

(54) PLATE CHANGER FOR AUTOSAMPLER

(71) Applicant: Shimadzu Corporation, Kyoto (JP)

(72) Inventor: Takuya Sawada, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 289 days.

(21) Appl. No.: 16/476,356

(22) PCT Filed: Nov. 17, 2017

(86) PCT No.: PCT/JP2017/041388
§ 371 (c)(1),
(2) Date: Jul. 8, 2019

(87) PCT Pub. No.: WO2018/168076
PCT Pub. Date: Sep. 20, 2018

(65) Prior Publication Data
US 2020/0041531 A1 Feb. 6, 2020

(30) Foreign Application Priority Data
Nov. 17, 2017 (JP) .............................. JP2017-049831

(51) Int. Cl.
*G01N 35/04* (2006.01)
*B01L 9/00* (2006.01)
*G01N 35/00* (2006.01)
*G01N 30/24* (2006.01)

(52) U.S. Cl.
CPC .............. *G01N 35/04* (2013.01); *B01L 9/523* (2013.01); *G01N 35/00029* (2013.01); *G01N 30/24* (2013.01); *G01N 2035/00039* (2013.01); *G01N 2035/0465* (2013.01)

(58) Field of Classification Search
None
See application file for complete search history.

(56) References Cited

U.S. PATENT DOCUMENTS

| 5,266,272 A | * | 11/1993 | Griner ................. B01L 3/50853 211/126.1 |
| 2004/0175258 A1 | * | 9/2004 | Haas ...................... B65G 47/90 414/273 |
| 2006/0073073 A1 | * | 4/2006 | Fichera ............ G01N 35/00029 422/63 |

FOREIGN PATENT DOCUMENTS

JP 2016-070695 A 5/2016

* cited by examiner

*Primary Examiner* — Daniel S Larkin
(74) *Attorney, Agent, or Firm* — Maier & Maier, PLLC

(57) ABSTRACT

A plate changer includes a plate storage that includes therein a plate setting base, and is provided with a transport window for retrieving, in one direction in a horizontal plane, a sample plate set on the plate setting base; and a transport mechanism that has at least a pair of holding portions holding both side surfaces of a sample plate, and holds and transports the sample plate by the holding portions. The plate storage has a plate guide that supports a side surface of the sample plate set on the plate setting base and guides the sample plate to a predetermined setting position. When the holding portion is inserted into the plate storage from the transport window, the plate guide is configured to move to a position not interfering with the action of the holding portion.

6 Claims, 2 Drawing Sheets

(A)

(B)

PLATE CHANGER FOR AUTOSAMPLER

FIELD

The present invention relates to a plate changer that has a plate storage in which multiple sample plates holding samples to be analyzed by an analyzer for liquid chromatography or the like are set, and a transport mechanism configured to retrieve an arbitrary sample plate stored in the plate storage.

BACKGROUND

In liquid chromatographic analysis, an autosampler may be used to inject multiple samples into an analysis channel for liquid chromatography. An autosampler is configured in such a way that multiple sample vials and sample plates holding the sample itself are set in predetermined positions, and the samples held by the sample plates are automatically collected and injected into the analysis channel for liquid chromatography (see Patent Document 1).

In a case where there are many samples to be analyzed by liquid chromatography, a plate changer may also be used to automatically reset the sample plate set in the autosampler. A plate changer includes a plate storage that stores multiple sample plates, and a transport mechanism that transports the sample plates stored in the plate storage. The transport mechanism is configured to retrieve a sample plate from the plate storage and set it on the autosampler, or store a sample plate set on the autosampler in the plate storage.

By using the plate changer described above, the user only needs to store the multiple sample plates holding the sample to be analyzed in the plate storage of the plate changer. The sample plates stored in the plate storage by the user are sequentially transported and set by the transport mechanism to the autosampler, and the samples are automatically and sequentially analyzed.

Patent Document 1: Japanese Patent Laid-open Publication No. 2016-70695

SUMMARY

In order for the transport mechanism of the plate changer as described above to hold the sample plate stored in the plate storage accurately, the sample plate needs to be positioned accurately in a predetermined position in the plate storage. If the position of the sample plate in the plate storage is shifted from the predetermined position, the transport mechanism cannot hold the sample plate properly. Hence, when the user stores the sample plate in the plate storage, the user must set the sample plate in a predetermined position in the plate storage accurately, and it takes time and effort for the user to set the sample plate.

For this reason, it is conceivable to provide a guide for bringing the sample plate to the correct setting position when the user inserts the sample plate into the plate storage, on both sides of a location where the sample plate is to be set in the plate storage. With this configuration, the guide sets the sample plate inserted into the plate storage in the correct setting position without the user having to think whether or not the sample plate is set in the correct position in the plate storage.

However, if such a guide is provided, a space in the plate storage into which an arm for holding a side surface of a sample plate is inserted is narrowed on both sides of the sample plate. In particular, if the storage space of one sample plate is narrowed so that many sample plates can be retained, there is no space for providing a guide for positioning the sample plate. If such a guide is provided, the transport mechanism cannot hold the sample plate to load and unload it to and from the plate storage.

In such a case, an attachment for allowing the transport mechanism to hold the sample plate may be attached to the sample plate, and the transport mechanism may hold the attachment. However, this requires the user to add the attachment to each sample plate before setting into the plate storage, which impairs usability.

In view of the foregoing, an objective of the present invention is to set a sample plate in a predetermined setting position in a plate storage accurately and easily, and enable a transport mechanism to hold the sample plate stored in the plate storage accurately without adding an attachment to the sample plate.

A plate changer for an autosampler according to the present invention includes: a plate storage that includes therein a plate setting base for setting a sample plate, and is provided with a transport window for retrieving, in one direction in a horizontal plane, a sample plate set on the plate setting base; and a transport mechanism that has at least a pair of holding portions for holding both side surfaces, which are parallel to the one direction, of a sample plate, and configured to hold the sample plate set on the plate setting base by the holding portions and to transport the sample plate. Then, the plate storage has a plate guide for supporting at least one of both the side surfaces of the sample plate set on the plate setting base so that the sample plate is led to a predetermined setting position on the plate setting base. Then, the plate guide is configured to move from a position interfering with the holding portion to a position not interfering with the action of the holding portion when the holding portion is inserted into the plate storage from the transport window.

Here, a "sample plate" in the present invention includes all plates usable in an autosampler of an analyzer for liquid chromatography or the like, such as a well plate having multiple wells for storing samples on an upper surface thereof, and a vial plate having multiple holes for holding sample vials containing samples on an upper surface thereof.

Further, a "predetermined setting position" on the plate setting base in the present invention refers to a position where the holding portion of the transport mechanism can hold a side surface of a sample plate accurately.

In a preferred embodiment of the present invention, the plate guide is preferably provided to support the both side surfaces of the sample plate set on the plate setting base in both side edges portions of the plate setting base. As a result, the positions of both side surfaces of the sample plate set on the plate setting base are defined by the plate guide, so that the sample plate can be set in a predetermined setting position more reliably.

The plate guide is preferably configured to move to the position not interfering with the action of the holding portion by pressure from the holding portion when the plate guide comes into contact with the holding portion inserted into the plate storage through the transport window and is pressed by the holding portion. This eliminates the need for a dedicated mechanism for driving the plate guide.

In the above case, an example of a preferred embodiment is a case in which the plate guide is elastically supported, by an elastic force of an elastic body, to a position where the plate guide supports a side surface of the sample plate set on the plate setting base.

An example of a more preferable embodiment is a case in which the plate guide is pivotally supported in a rotatable manner so as to be displaced between the position where the plate guide interferes with the holding portion of the transport mechanism and the position where the plate guide does not interfere with the holding portion of the transport mechanism. By adopting such a structure, the internal configuration of the plate storage can be simplified, and the cost can be reduced.

In the plate storage in the plate changer of the present invention, a setting window for a user to set a sample plate on the plate setting base may be provided in a position facing the transport window. In this case, the plate setting base preferably includes, in a position closer to the setting window than the plate guide and not interfering with the action of the holding portion, a slide guide for supporting a side surface of a sample plate being inserted into the plate storage while sliding on the plate setting base from the setting window side to the transport window side, and guiding the sample plate to the predetermined setting position. This makes it even easier for the user to set the sample plate in a predetermined setting position.

In the plate changer for an autosampler according to the present invention, the plate storage has the plate guide for supporting at least one of the two side surfaces of the sample plate set on the plate setting base and guiding the sample plate to a predetermined setting position on the plate setting base. This facilitates setting of a sample plate in a predetermined position on the plate setting base. Then, the plate guide is configured to move to a position where the plate guide does not interfere with the action of the holding portion when the holding portion of the transport mechanism is inserted into the plate storage through the transport window. Hence, it is possible to sandwich and hold the side surface of the sample plate by the holding portion of the transport mechanism without adding an attachment to the sample plate. That is, even though the plate changer of the present invention is provided with a plate guide that facilitates setting of a sample plate in a correct setting position, the plate changer can directly hold a side surface of the sample plate by the holding portion of the transport mechanism without adding an attachment to the sample plate.

DETAILED DESCRIPTION

Hereinafter, an embodiment of a plate changer of the present invention will be described with reference to the drawings.

Figure 1:
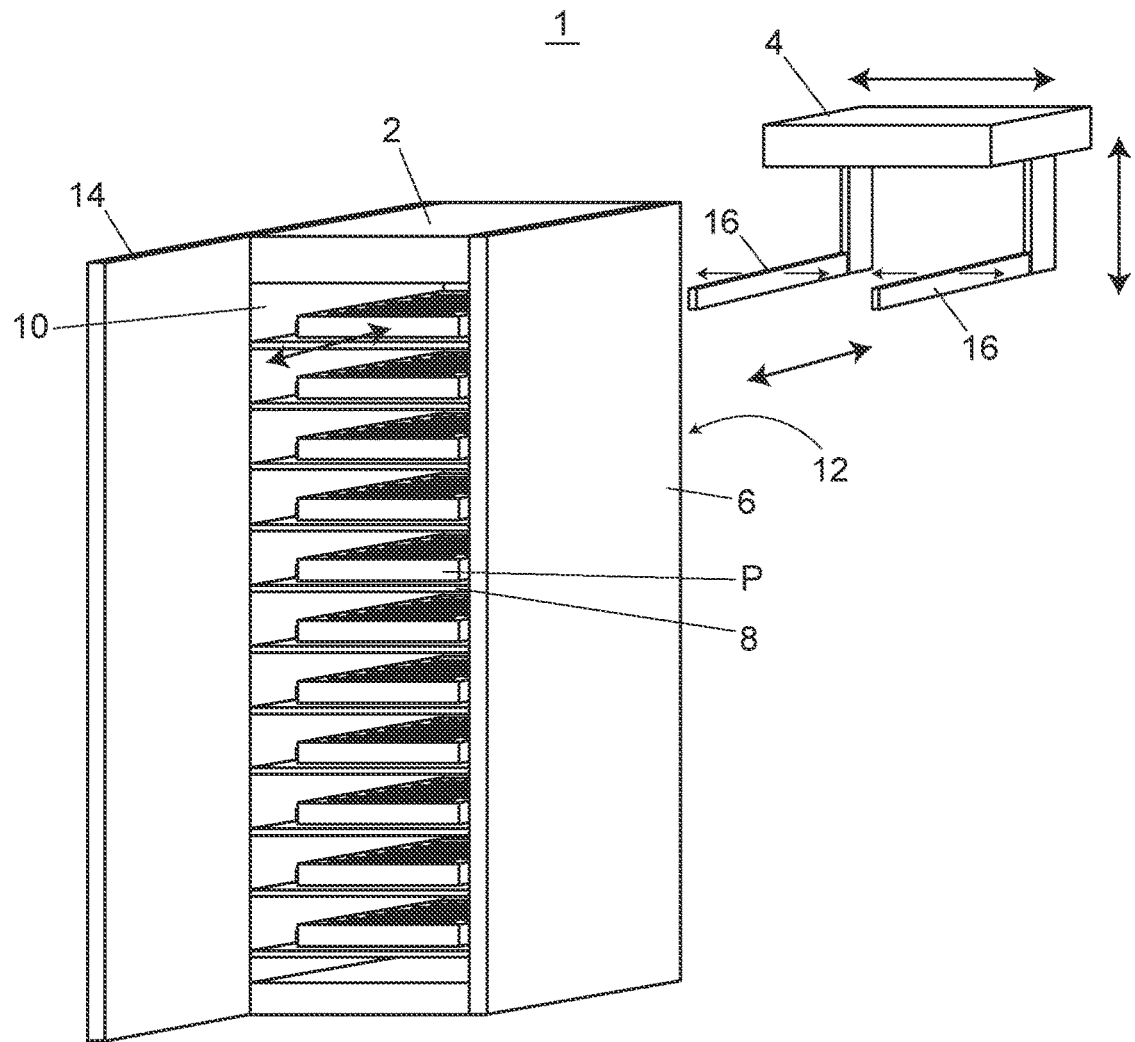
FIG. 1 is a schematic configuration diagram showing an embodiment of a plate changer.

As shown in FIG. 1, a plate changer 1 includes a plate storage 2 and a transport mechanism 4. The plate storage 2 is provided to store and retain multiple sample plates P inside a housing 6. The sample plate P may be any plate, as long as it is a plate used in an autosampler of an analyzer. Examples of the sample plate P include a well plate having multiple wells for storing samples on an upper surface thereof, and a vial plate having multiple holes for storing multiple sample vials containing samples on an upper surface thereof.

The plate storage 2 includes multiple plate setting bases 8 for setting the sample plate P. The plate setting bases 8 are arranged next to one another in the vertical direction, and one sample plate P is set on each plate setting base 8. The plate storage 2 includes a setting window 10 on the front side and a transport window 12 on the back side. The setting window 10 and the transport window 12 are openings provided in positions of the housing 6 facing each other.

The setting window 10 is provided for the user to set the sample plate P on a desired plate setting base 8, or to retrieve the sample plate P set on the plate setting base 8. An opening-closing door 14 is provided in the setting window 10. The sample plate P is set on the plate setting base 8 by sliding the sample plate P on the plate setting base 8 in one direction in a horizontal plane indicated by an arrow in FIG. 1, that is, a direction from the setting window 10 side to the transport window 12 side. The sample plate P is retrieved from the plate setting base 8 by sliding the sample plate P in a direction opposite to the setting direction, that is, in a direction from the transport window 12 side to the setting window 10 side. In the embodiment, the direction in which the sample plate P is slid on the plate setting base 8 at the time of setting or retrieval of the sample plate P is referred to as "slide direction".

The transport window 12 is provided for the transport mechanism 4 to set the sample plate P on a predetermined plate setting base 8 or to retrieve a sample plate P set on the plate setting base 8.

The transport mechanism 4 is moved in the direction in the horizontal plane and in the vertical direction on the back side of the plate storage 2 by an unillustrated drive mechanism. The transport mechanism 4 includes a pair of arms 16 extending horizontally and parallel to each other. The two arms 16 extend in parallel with the slide direction of the sample plate P in the plate storage 2. The transport mechanism 4 can variably adjust the distance between the two arms 16, and can hold side surfaces of the sample plate P by sandwiching the sample plate P between the two arms 16. The two arms 16 form a holding portion for holding the side surfaces of the sample plate P.

The transport mechanism 4 inserts the two arms 16 into the plate storage 2 from the side of the transport window 12 of the plate storage 2 to hold the side surfaces of the sample plate P set on the plate setting base 8 in the plate storage 2, retrieves the sample plate P from the plate storage 2 by sliding the sample plate P in the aforementioned slide direction, and transports the sample plate P to a predetermined transport destination. The transport destination of the sample plate P is, for example, an autosampler used for liquid chromatography. Further, the transport mechanism 4 transports the sample plate P for which the sample processing is completed to the plate storage 2, and sets the sample plate P by inserting the sample plate P through the transport window 12 and on a predetermined plate setting base 8 in the plate storage 2.

Note that although not described in detail in the embodiment, the plate storage 2 may include a temperature adjustment mechanism (not shown) such as a heater or a Peltier device for adjusting the temperature of the sample plate P stored inside the housing 6 to a preset temperature.

Figure 2:
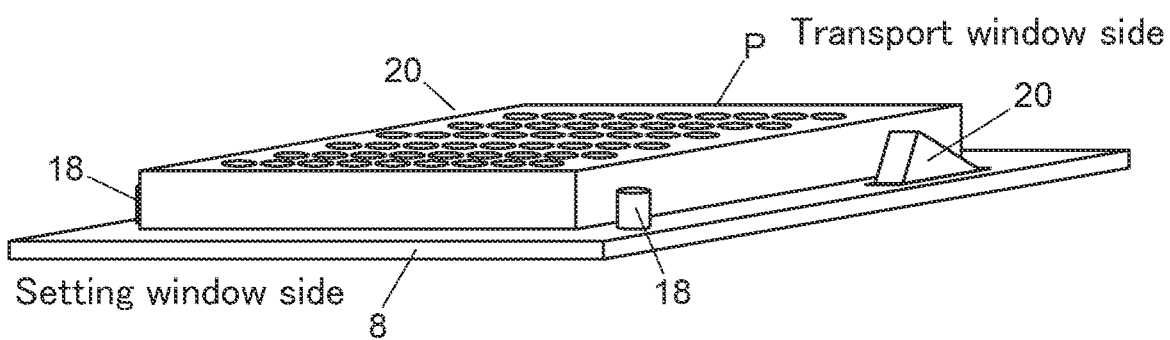
FIG. 2 is a perspective view showing an example of the structure inside a plate storage.

FIG. 2 shows one plate setting base 8 extracted to describe the internal structure of the plate storage 2 of the plate changer 1.

In order for the transport mechanism 4 (see FIG. 1) to hold the sample plate P in the plate storage 2 accurately by the arms 16, the sample plate P needs to be set accurately in a predetermined setting position on the plate setting base 8. If the position of the sample plate P set on the plate setting base 8 is shifted from the predetermined setting position, the arms 16 of the transport mechanism 4 cannot hold the sample plate P on the plate setting base 8 accurately.

The plate storage 2 of the embodiment includes a slide guide 18 and a plate guide 20 in a side edge portion of the plate setting base 8, as a mechanism for setting the sample plate P accurately in a predetermined setting position on the plate setting base 8.

The slide guide 18 is provided in both side edge portions on the plate setting base 8 on the setting window 10 side. The slide guide 18 is provided to support the side surface of the sample plate P inserted from the setting window 10 side and sliding on the plate setting base 8, and guide the sample plate P to the correct setting position on the plate setting base 8. The slide guide 18 is provided in a position not interfering with the action of the arm 16 of the transport mechanism 4 inserted from the transport window 12 side.

Note that while the slide guide 18 has a columnar shape in the embodiment, the slide guide 18 may have any shape, as long as it can support the side surface of the sample plate P sliding on the plate setting base 8 and guide the sample plate P to a predetermined setting position. Further, the slide guide 18 may be configured by a roller that rotates in the horizontal plane so as not to impart resistance to the sliding of the sample plate P.

The plate guide 20 is provided in both side edge portions on the transport window 12 side of the slide guide 18. The plate guide 20 is provided to support the transport window 12 side portion of the side surface of the sample plate P sliding on the plate setting base 8 from the setting window 10 side toward the transport window 12 side, and position the transport window 12 side portion of the sample plate P in a predetermined setting position.

Since the slide guide 18 and the plate guide 20 are provided in the plate setting base 8, the user can accurately set the sample plate P in a predetermined setting position on the plate setting base 8 easily and smoothly. That is, the slide direction of the sample plate P inserted onto the plate setting base 8 by the user is defined by the slide guide 18, and the position of the transport window 12 side portion of the sample plate P inserted to the back of the plate storage 2 is determined by the plate guide 20.

Note that the plate guide 20 does not necessarily have to be provided in "both" side edge portions of the plate setting base 8, and may be provided in just one side edge portion of the plate setting base 8. Even in a case where the plate guide 20 is provided in just one side edge portion of the plate setting base 8, the sample plate P can be set accurately in a predetermined setting position by bringing the position of one side surface of the sample plate P into contact with the plate guide 20 for positioning.

Here, the space on the side of the sample plate P set on the plate setting base 8 is a space for the arm 16 of the transport mechanism 4 to perform an action of holding the sample plate P. Although the plate guide 20 is provided in this space, the plate guide 20 is configured to move to a position not interfering with the action of the arm 16 when the arm 16 is inserted into this space from the transport window 12 side.

An example of the movement principle of the plate guide 20 will be described with reference to FIG. 3.

The plate guide 20 is a substantially triangular prism-shaped member having one side surface 20a on the transport window 12 side. A lower portion of the plate guide 20 on the transport window 12 side is pivotally supported so as to be rotatable in a vertical plane, by a support shaft 22 extending in a horizontal direction (direction perpendicular to sheet surface in FIG. 3) orthogonal to the slide direction of the sample plate P.

The plate guide 20 is biased in one rotational direction (clockwise direction in FIG. 3) in the vertical plane by an elastic member 24. A stopper 20b is provided in an end of the plate guide 20 on the setting window 10 side, and the stopper 20b is engaged with a lower surface of the plate setting base 8. Accordingly, since the stopper 20b is engaged with the lower surface of the plate setting base 8, the plate guide 20 which tends to rotate in the clockwise direction by the elastic force of the elastic member 24 is maintained in a state (state in FIG. 3(A)) where the one side surface 20a projects upward from the plate setting base 8 through an opening provided in the plate setting base 8. That is, the plate guide 20 is elastically supported by the elastic member 24 so as to be maintained in the state projecting from an upper surface of the plate setting base 8. In the state of FIG. 3(A), the one side surface 20a of the plate guide 20 is inclined so as to lower itself from the setting window 10 side toward the transport window 12 side.

In the embodiment, a torsion spring is used as the elastic member 24. An engaging portion 26 that engages with one end of the torsion spring 24 is provided below the plate setting base 8. Note that any elastic body may be used as the elastic member 24 as long as it can elastically support the plate guide 20.

Figure 3:
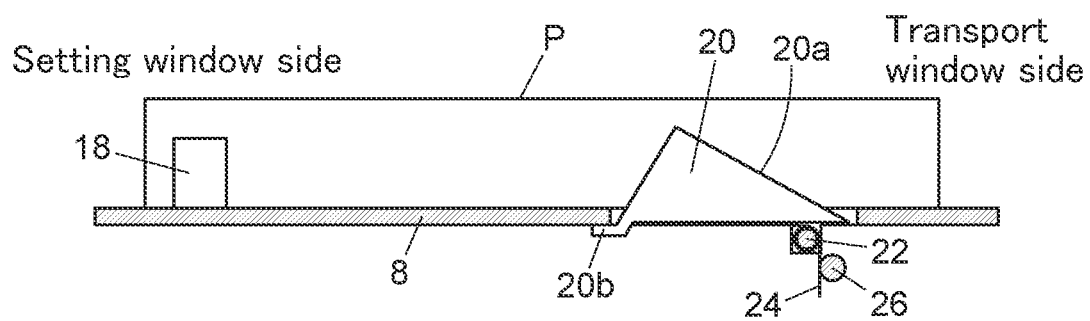
FIG. 3 is a cross-sectional view of a plate setting base in a plate guide portion showing an example of the movement principle of the plate guide, where part (A) is a state in which an arm is not inserted, and part (B) is a state in which the arm is inserted.
Figure 3:
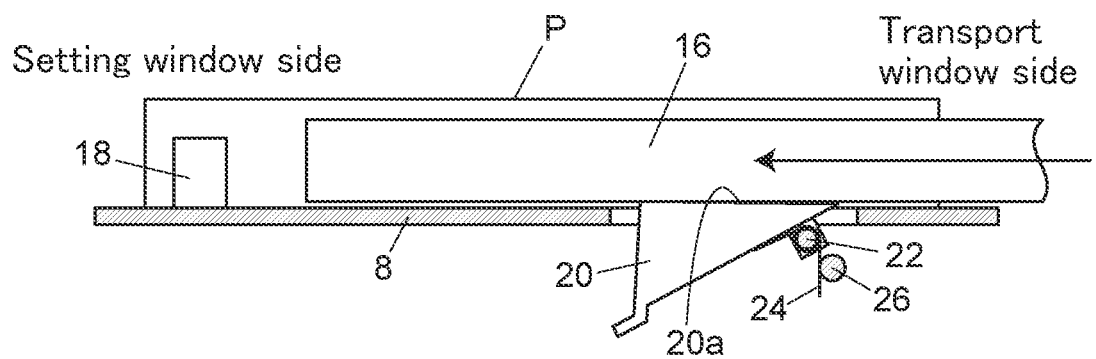

As shown in FIG. 3 (B), when the arm 16 of the transport mechanism 4 is inserted into the space on the side of the sample plate P on the plate setting portion 8, the arm 16 pushes down the one side surface 20a of the plate guide 20 to the setting window 10 side, so that the plate guide 20 is stored below the plate setting base 8. That is, when the arm 16 depresses the one side surface 20a of the plate guide 20, the plate guide 20 is moved to a position not interfering with the action of the arm 16.

Thus, when the sample plate P is set on the plate setting base 8, the plate guide 20 serves as a guide for guiding the sample plate P to a predetermined setting position. Meanwhile, when the arm 16 of the transport mechanism 4 enters from the transport window 12 side, the plate guide 20 moves to a position not interfering with the action of the arm 16. This structure enables the arm 16 of the transport mechanism 4 to hold the side surface of the sample plate P, while facilitating setting of the sample plate P in a predetermined setting position on the plate setting base 8.

The embodiment described above is merely an example of the embodiment of the present invention, and design changes can be made as appropriate. For example, the shape of the plate guide 20 is not limited to that shown in this embodiment. The one side surface 20a of the plate guide 20 does not necessarily have to be straight, and may be curved. In addition, a roller or the like for reducing friction with the arm 16 may be provided on the one side surface 20a. Note that such a roller may be provided on the arm 16 side.

The invention claimed is:

1. A plate changer configured for an autosampler comprising:
   a plate storage that includes therein a plate setting base configured for setting a sample plate, and is provided with a transport window configured for retrieving, in one direction in a horizontal plane, a sample plate that is set on the plate setting base; and a transport mechanism that has at least a pair of holding portions configured for holding both side surfaces, which are parallel to the one direction, of the sample plate, and configured to hold the sample plate that is set on the plate setting base by the at least the pair of holding portions and to transport the sample plate, wherein the plate setting base has a plate guide configured for supporting at least one of both the side surfaces of the sample plate that is set on the plate setting base so that the sample plate is led to a predetermined setting position on the plate setting base, and the plate guide is configured to move from a position interfering with the at least the pair of holding portions to a position not interfering with the action of the at least the pair of holding portions when the holding portion is inserted into the plate storage through the transport window.

2. The plate changer according to claim 1, wherein the plate guide is provided to support both the side surfaces of the sample plate that is set on the plate setting base in both side edge portions of the plate setting base.

3. The plate changer according to claim 1, wherein the plate guide is configured to move to the position not interfering with the action of the at least the pair of holding portions by pressure from the at least the pair of holding portions when the plate guide comes into contact with the at least the pair of holding portions inserted into the plate storage through the transport window and is pressed by the at least the pair of holding portions.

4. The plate changer according to claim 3, wherein the plate guide is elastically supported, by an elastic force of an elastic body, to a position where the plate guide supports a side surface of the sample plate that is set on the plate setting base.

5. The plate changer according to of claim 3, wherein the plate guide is pivotally supported in a rotatable manner so as to move between the position interfering with the at least the pair of holding portions and the position not interfering with the at least the pair of holding portions.

6. The plate changer according to claim 3, wherein the plate storage includes in a position facing the transport window, a setting window configured for a user to set a sample plate on the plate setting base, and in a position closer to the setting window than the plate guide and not interfering with the action of the at least the pair of holding portions, a slide guide configured for supporting a side surface of a sample plate being inserted into the plate storage while sliding on the plate setting base from the setting window side to the transport window side, and guiding the sample plate to the predetermined setting position.

* * * * *